(12) United States Patent
Chen

(10) Patent No.: US 7,936,559 B2
(45) Date of Patent: May 3, 2011

(54) WIDE-ANGLE DOUBLE-HINGE STRUCTURE

(75) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 12/078,321

(22) Filed: Mar. 28, 2008

(65) Prior Publication Data

US 2010/0232096 A1  Sep. 16, 2010

(51) Int. Cl.
*H05K 7/00* (2006.01)
*E03F 1/02* (2006.01)
*E05D 11/10* (2006.01)
*H04M 1/00* (2006.01)

(52) U.S. Cl. .. 361/679.27; 16/330; 16/303; 361/679.29; 361/679.3; 455/575.3

(58) Field of Classification Search ............. 361/679.01, 361/679.02, 679.55–679.59, 679.08, 679.09, 361/679.3, 679.21; 345/156, 157, 168, 169, 345/184; 455/455, 575.1, 575.3, 575.4, 575.8; 340/384.71, 566; 16/303, 330

See application file for complete search history.

(56) References Cited

U.S. PATENT DOCUMENTS

| | | | | |
|---|---|---|---|---|
| 4,976,007 A | * | 12/1990 | Lam | ................................ 16/302 |
| 6,581,893 B1 | * | 6/2003 | Lu | .............................. 248/291.1 |
| 2003/0213101 A1 | * | 11/2003 | Lin | ................................ 16/368 |
| 2005/0037821 A1 | * | 2/2005 | Takagi | ........................ 455/575.3 |
| 2006/0179612 A1 | * | 8/2006 | Oshima et al. | .................. 16/330 |

* cited by examiner

*Primary Examiner* — Jayprakash N Gandhi
*Assistant Examiner* — Jerry Wu
(74) *Attorney, Agent, or Firm* — Guice Patents PLLC

(57) ABSTRACT

A wide-angle double-hinge structure to allow an electronic device to flip at different angles includes a coupling plate, a resistant hinge and a cam hinge. The double-hinge structure couples a first chassis and a second chassis of the electronic device to enable users to selectively flip in an ordinary notebook computer operating condition or a back-to-back operating condition according to their preference. Thus the users can selectively perform input operation in a handheld or desktop fashion.

8 Claims, 8 Drawing Sheets

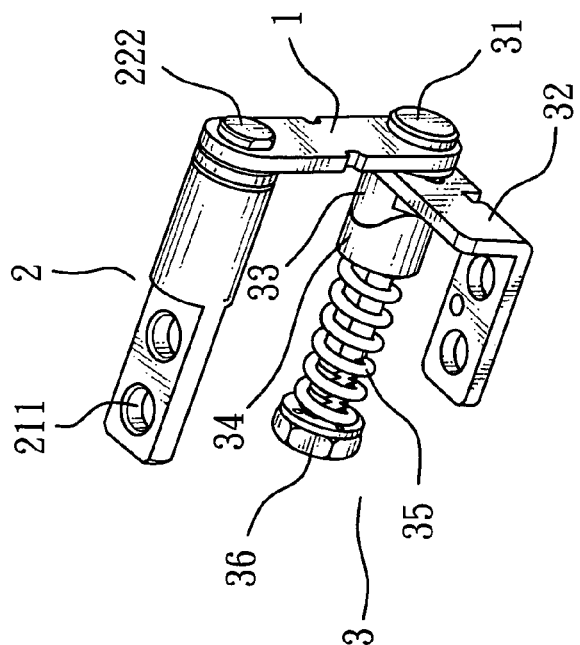
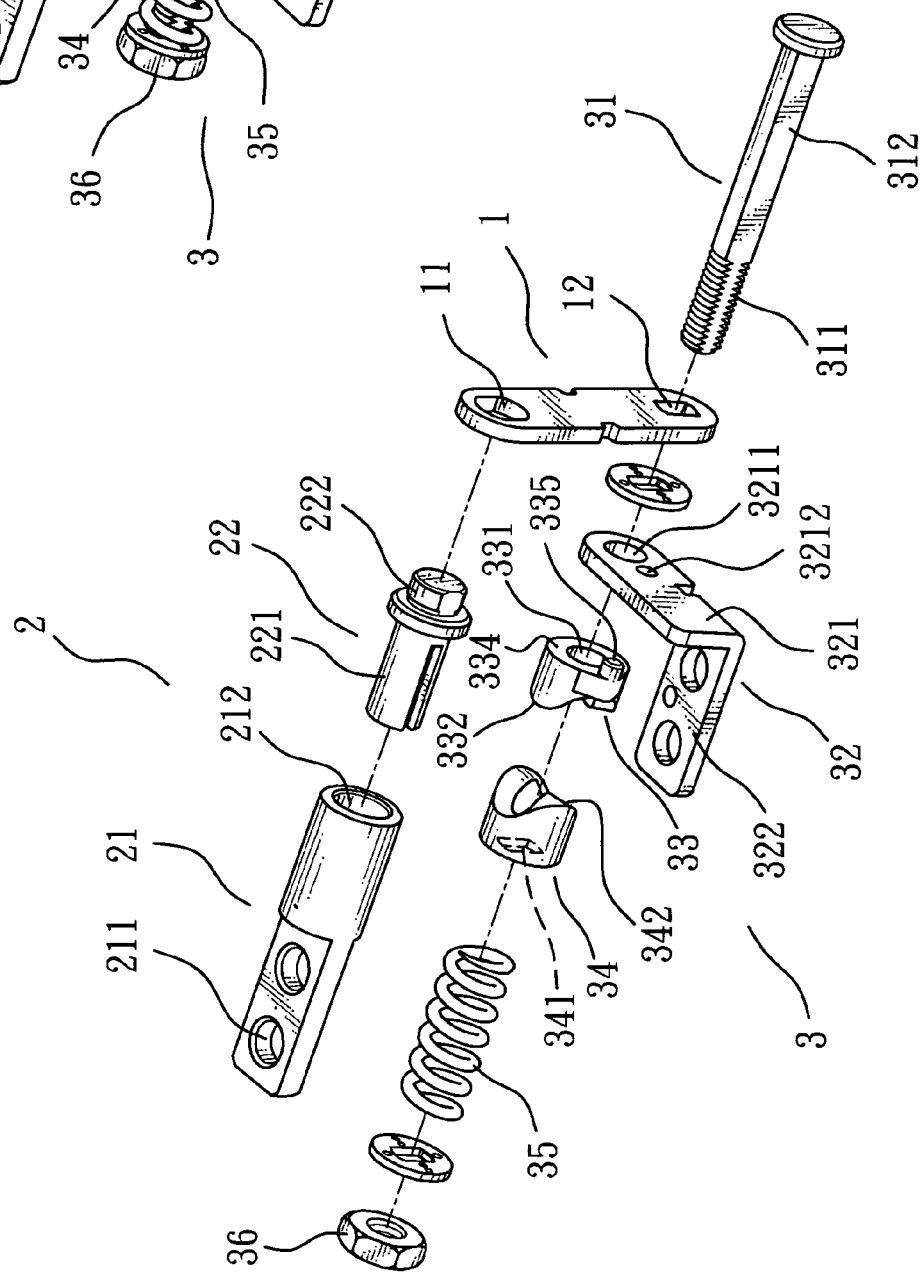

WIDE-ANGLE DOUBLE-HINGE STRUCTURE

BACKGROUND OF THE INVENTION

1. Field of the Invention

The present invention relates to a wide-angle double-hinge structure and particularly to a double-hinge structure to enable an electronic device to flip at different angles to facilitate user input operation in a handheld or desktop fashion.

2. Description of the Prior Art

The prevailing trend of computer development increasingly focuses on portability. Most computer makers invest heavily aiming to make computer usable anywhere anytime. Power lasting time and performance also are important factors. Meeting these ends has to rely on power-saving elements developed by semiconductor manufacturers and high capacity batteries developed by battery makers. To overcome the constraint of using site has to rely on system designers. Most notebook computers at present adopt a foldable two-piece chassis. One piece is for a computer screen and other piece is for a keyboard. The two pieces can be unfolded substantially perpendicular to each other to be rested on a table for use. But it is not convenient for handheld operation. The model for handheld operation mostly is tablet computer which has the screen located on the chassis. When in use a user holds the computer with one hand and holds a stylus with other hand to tick a function key or do writing on the screen.

Although the tablet computer makes handheld operation easier, many important computer operations relate to text entry. As the tablet computer uses the stylus as the main input means, it is slower and takes more efforts than the conventional keyboard operation. Hence while the portability improves, input operation becomes a constraint. As a result, the tablet computer is not well accepted on the market. It mostly is limited to special applications, such as doctor's touring wards, warehouse stock taking and the like that require merely ticking of options without much text entry.

To facilitate input operation, some tablet computers provide a fan-type keyboard table on a touch screen to enable users to hold the computer with two hands and depress keys with two thumbs. As the two hands have to hold the computer, the moving range of the thumbs is limited. Moreover, the thumbs are naturally clumsier in operation. Hence operation speed is slower than the conventional real keyboard.

There is another design which adopts a slidable real keyboard. When there is a need to do a great amount of text entry, the rear keyboard hidden inside the chassis can be moved out. However, its operation approach also is same as the one with the touch keyboard table on the screen, and require user's fingers other than the thumbs to hold the computer, and input operation is done through the clumsy thumbs. As the handheld portion is the keyboard, and the screen is extended rearwards, the gravity center of the computer is located outside the two hands. Holding the computer is difficult and cannot last for a long duration for the general users.

SUMMARY OF THE INVENTION

To resolve the aforesaid problems the operation keys and the screen have to be positioned back to back, with the keyboard table displayed on the screen mapping the keys at the back side, and each key has to be equipped with a tactile sensor so that user's eyes can see the keyboard table on the screen to determine the key layout and finger positions at the back side, then the rest fingers other than the thumbs can be freed to perform operation on the keys.

But such a novel operation interface and method could hinder user's contact. This is especially troublesome for novices. Many people even are discouraged to buy or use. To provide two alternative use methods at the same time to allow users to make selection will be a great incentive to reduce use's reluctance. One is like the conventional notebook computer operation approach that allows a screen 91 to be unfolded at an angle θ1 about 90 degrees, and has a keyboard 921 located above a body 92 (referring to FIG. 1). Such an operation method is same as the conventional notebook computer and used to by users without problems. The only handicap is that it needs a table top when in use.

To overcome the shortcomings of the conventional techniques, the screen must be swivelable at a wide angle greater than 270 degrees so that user's fingers other than the thumbs can hold one side where the keys are located while the screen faces the user, and the body and the screen can be folded at an angle no greater than 90 degrees. Therefore it is an object of the invention to provide a wide-angle double-hinge structure that includes a coupling plate, a resistant hinge and a cam hinge. The double-hinge structure couples a first chassis and a second chassis of an electronic device to allow users to selectively flip to become an ordinary notebook computer operation condition, or a back-to-back operation condition according to user's preference. Therefore user can do input operation on a table top or in a handheld manner as desired.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3 is a perspective view of the invention.

FIG. 4 is an exploded view of the invention.

DESCRIPTION OF THE PREFERRED EMBODIMENTS

Figure 1:
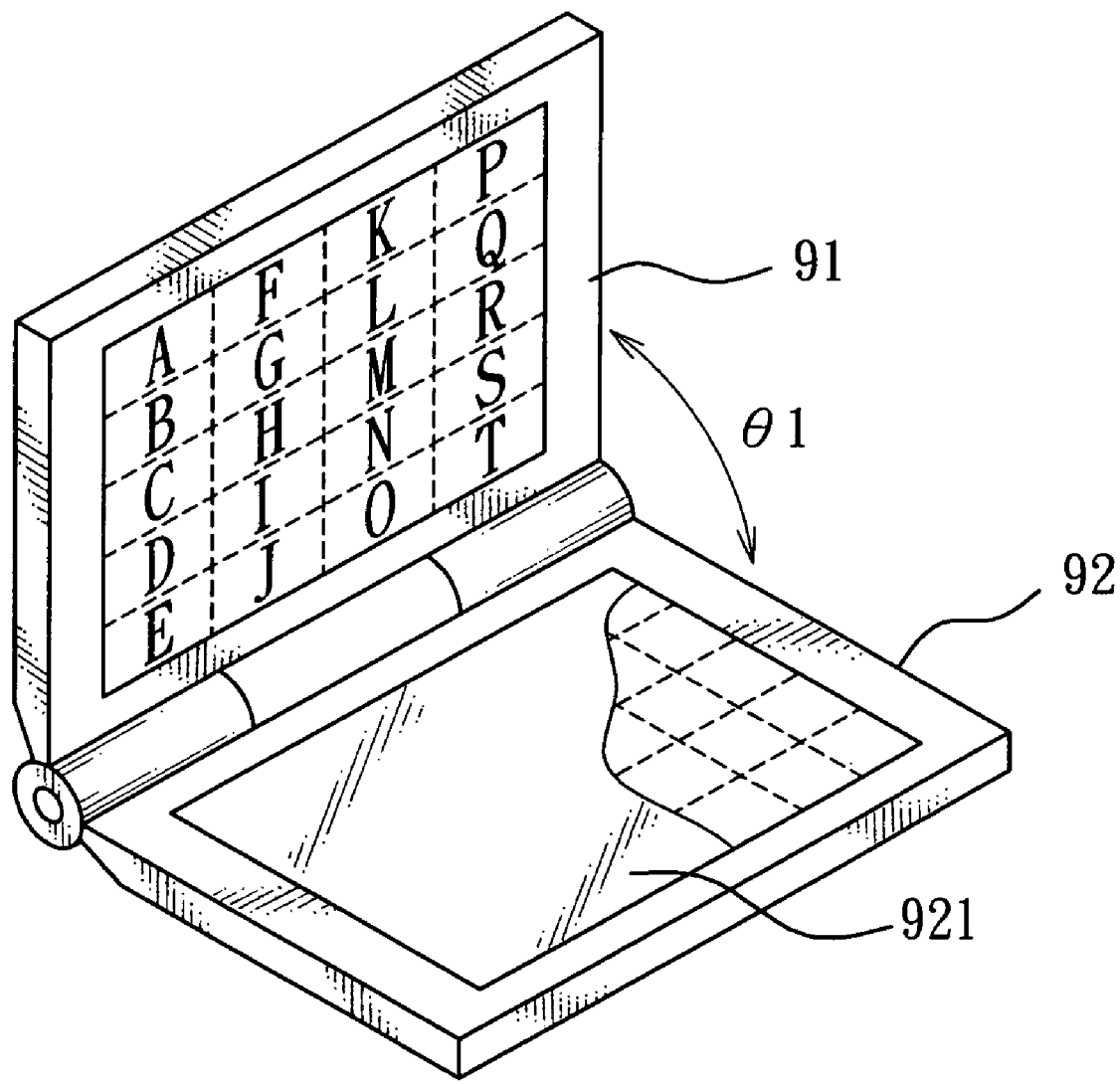
FIG. 1 is a schematic view of a conventional portable electronic device in a use condition.
Figure 2:
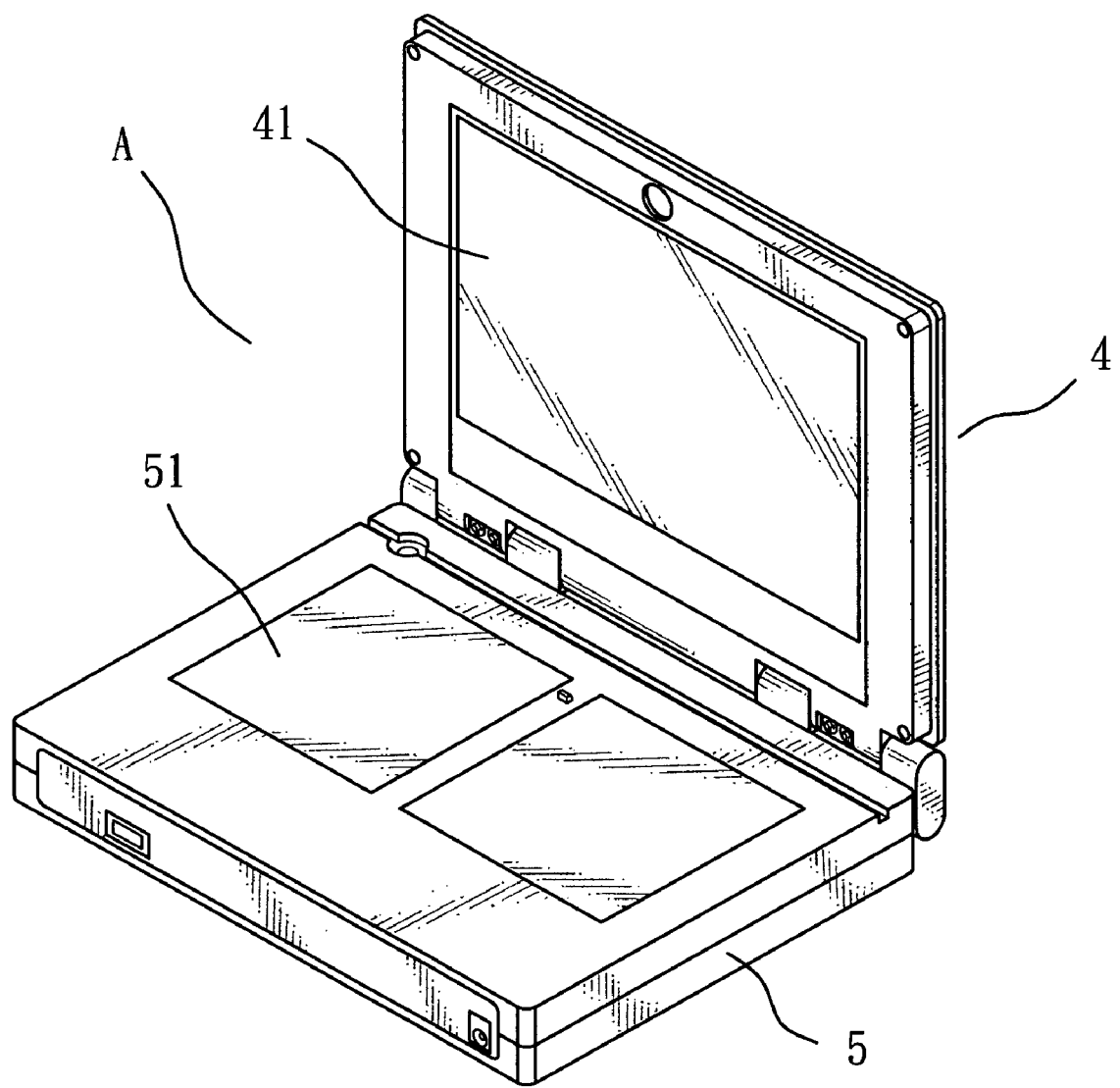
FIG. 2 is a perspective view of an embodiment of the invention.
Figure 5:
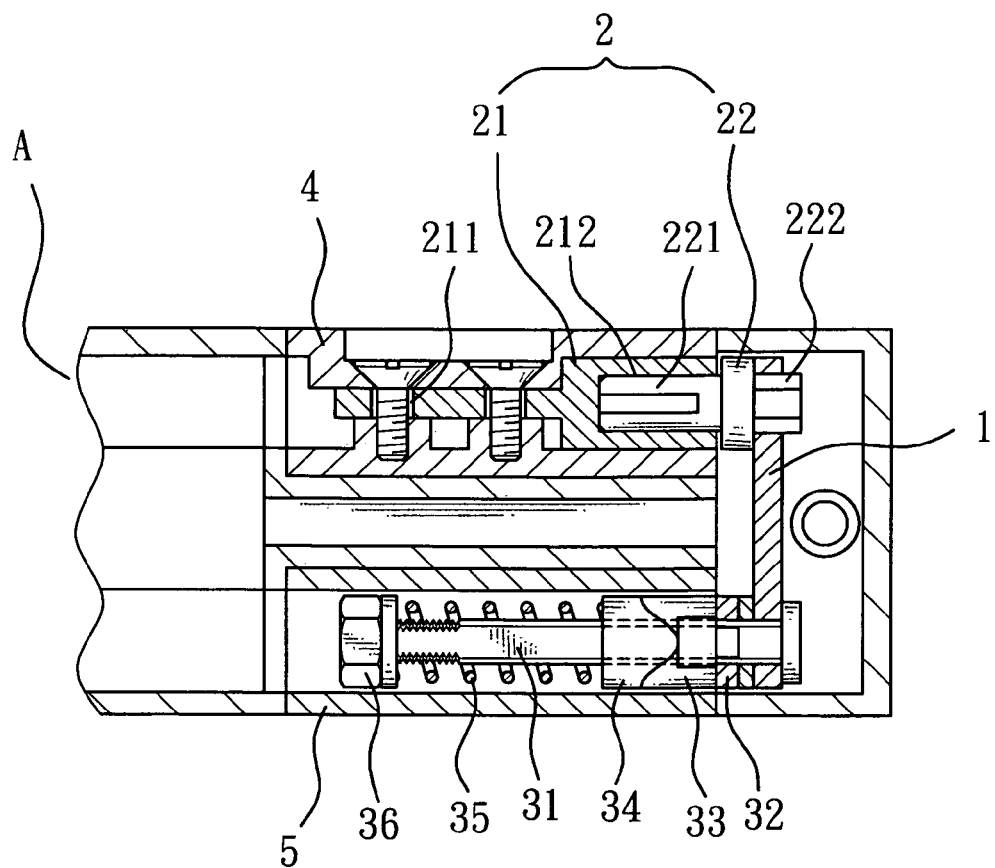
FIG. 5 is a sectional view of the invention.
Figure 6:
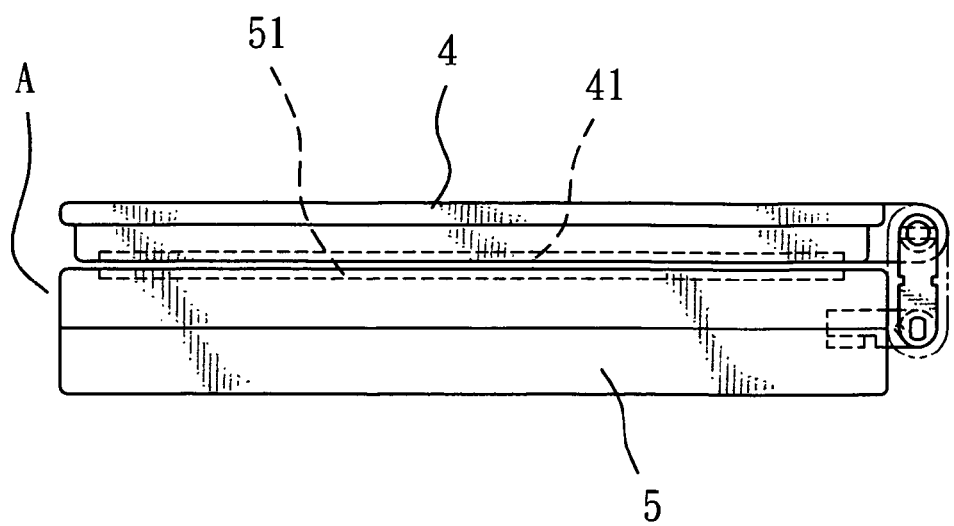
FIG. 6 is schematic view-1 of an embodiment of the invention in an operating condition.

Referring to FIGS. 2 through 6, the wide-angle double-hinge structure according to the invention includes a coupling plate 1, a resistant hinge 2 and a cam hinge 3 that are installed on an electronic device A to couple a first chassis 4 and a second chassis 5. The first chassis 4 has a display screen 41. The second chassis 5 has at least one key zone 51 which may be a touch key.

The coupling plate 1 has a first retaining hole 11 and a second retaining hole 12 that are non-circular through holes to retain respectively the resistant hinge 2 and the cam hinge 3.

The resistant hinge 2 has a fastening axle 22 at one end fastened to the coupling plate 1 and a movable sleeve 21 at another end with at least one fastening hole 211 formed thereon to be fastened to one end of the first chassis 4. The sleeve 21 has an axle 212 on other end to be inserted by a bolt 221 of the fastening axle 22. The fastening axle 22 has a retaining portion 222 at one side to be confined in the first retaining hole 11 of the coupling plate 1.

The cam hinge 3 has one end fastened to the coupling plate 1 and a stem 31 running through an anchor plate 32, a first element 33, a second element 34 and a spring 35 to be fastened by a nut 36.

The stem 31 runs through the second retaining hole 12 of the coupling plate 1 and has a screw thread section 311 on one end and a polygonal section 312 to be confined in the second retaining hole 12 to be driven together with the coupling plate 1.

The anchor plate 32 has a first bracing plate 321 with an aperture 3211 and an anchor hole 3212 formed thereon, and a second bracing plate 322 perpendicular to the first bracing plate 321 to be fastened to one end of the second chassis 5.

The first element 33 has a circular through hole 331 to be run through by the stem 31 and a first cam action surface 332 on one side and a latch stub 335 on another side 334 to be wedged in the anchor hole 3212.

The second element 34 has a rectangular hole 341 run through by the stem 31 to be driven together, and a second cam action surface 342 on one side to form interaction with the first cam action surface 332 of the first element 33.

The spring 35 pushes the second element 34 in regular conditions.

The nut 36 is fastened to the screw thread section 311 of the stem 31 to confine the elements set forth above. It also can adjust the elastic force of the spring 35 pushing the second element 34 to form a resistant force when the second element 34 tries to rotate. The resistant force is slightly greater than the rotation resistant force of the resistant hinge during rotating.

Figure 7:
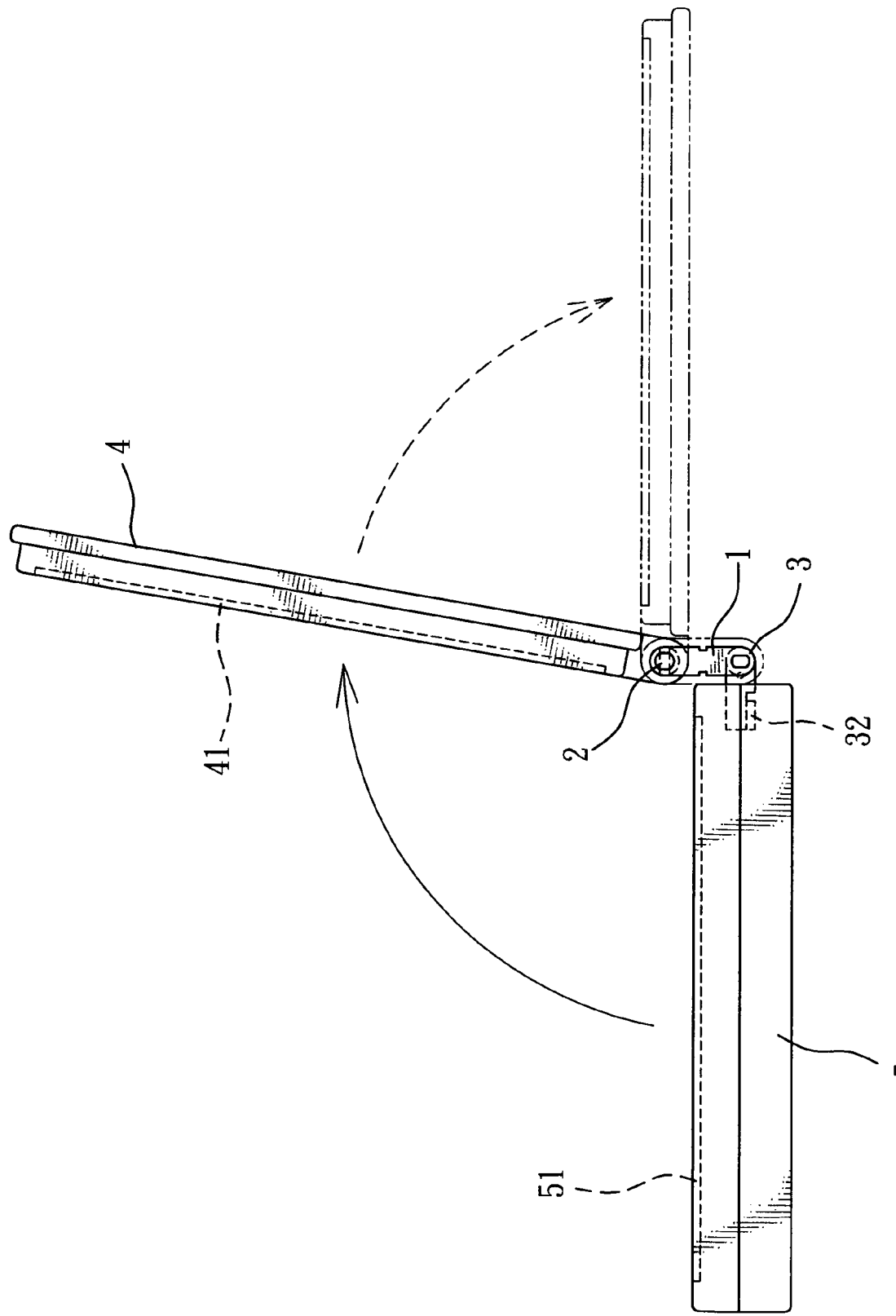
FIG. 7 is schematic view-2 of an embodiment of the invention in an operating condition.
Figure 8:
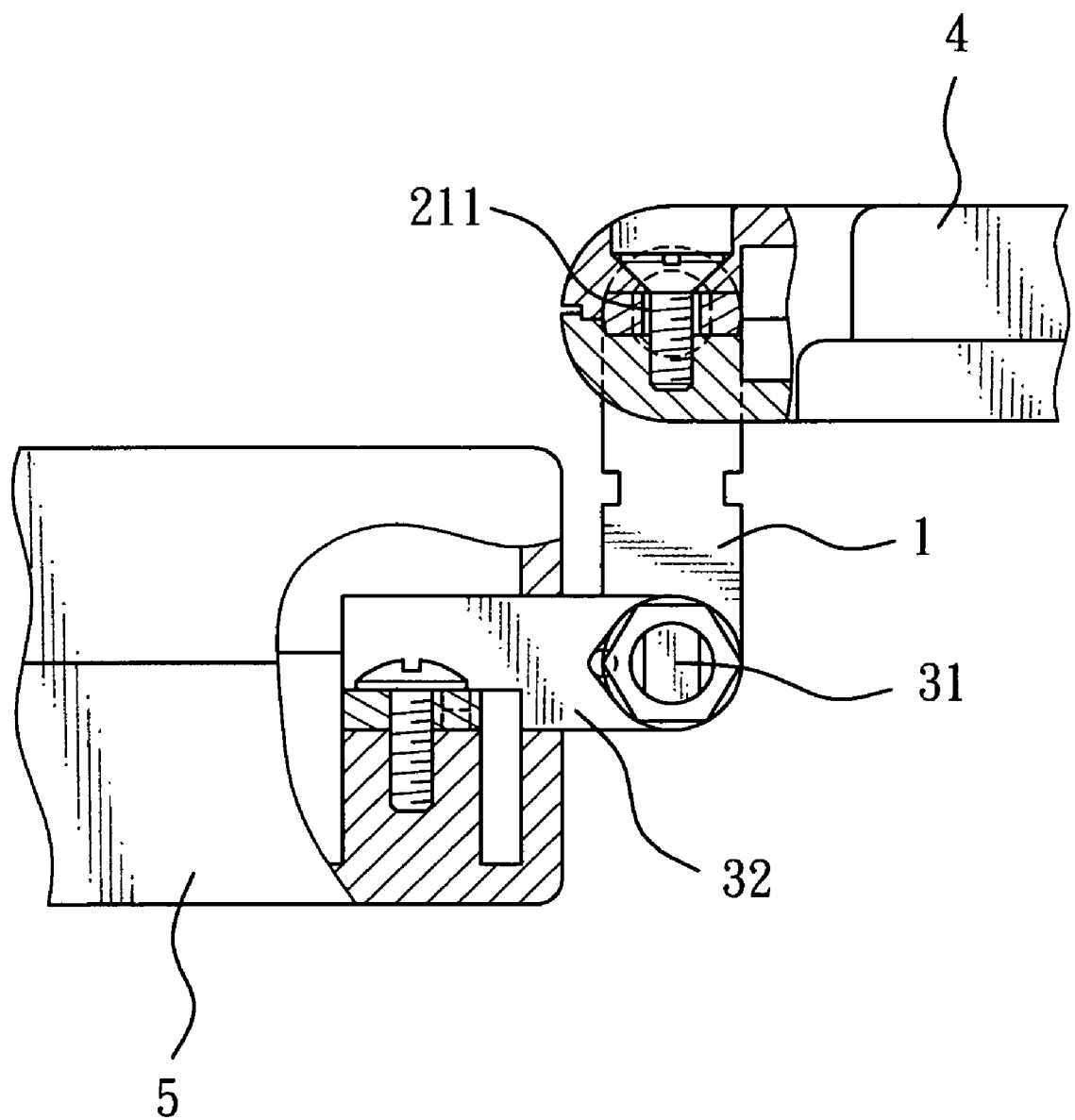
FIG. 8 is a sectional view of an embodiment of the invention.
Figure 9:
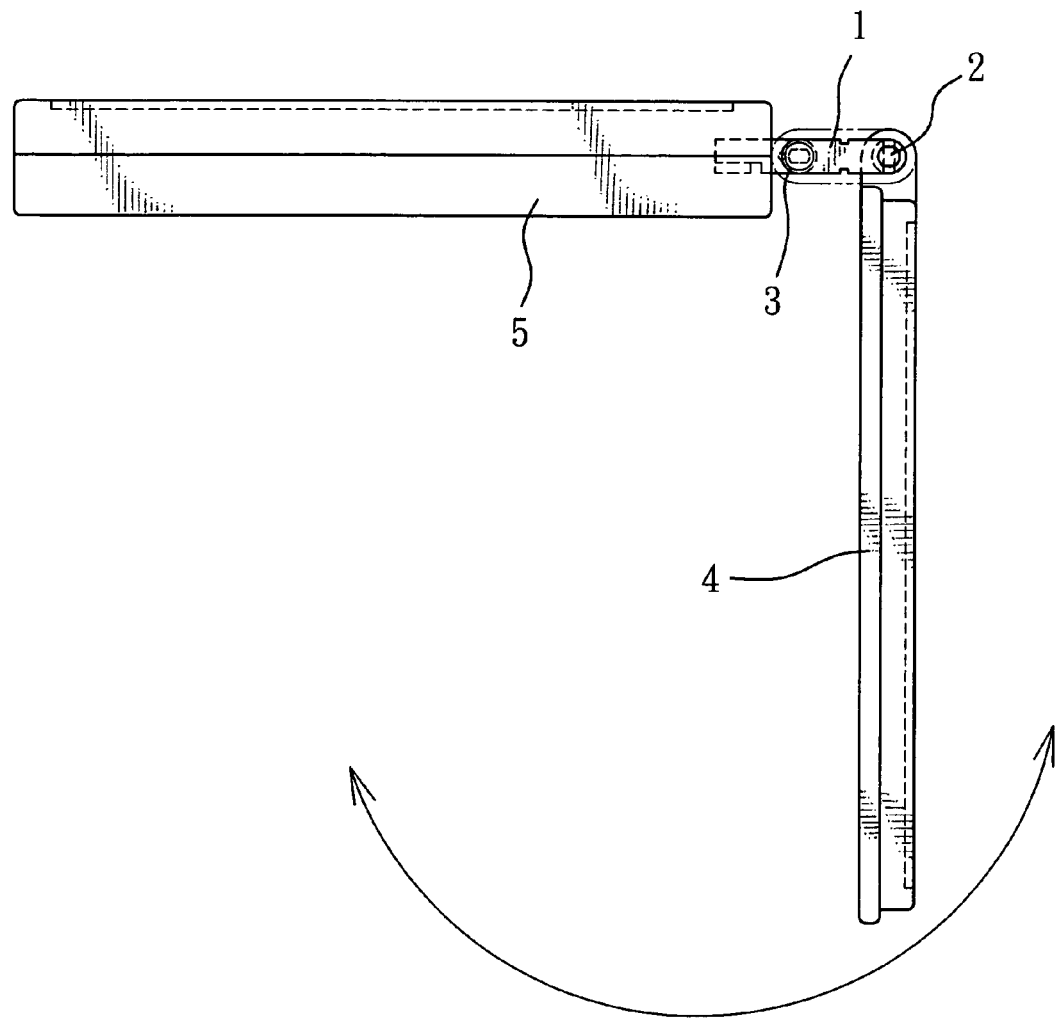
FIG. 9 is schematic view-3 of an embodiment of the invention in an operating condition.
Figure 10:
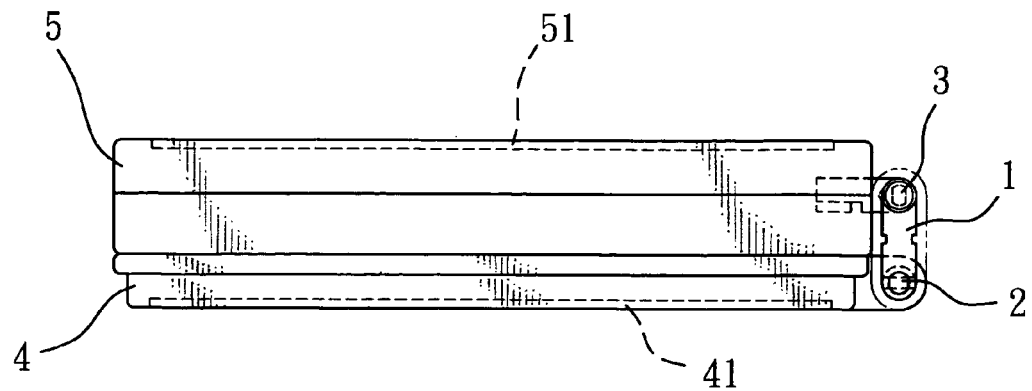
FIG. 10 is schematic view-4 of an embodiment of the invention in an operating condition.
Figure 11:
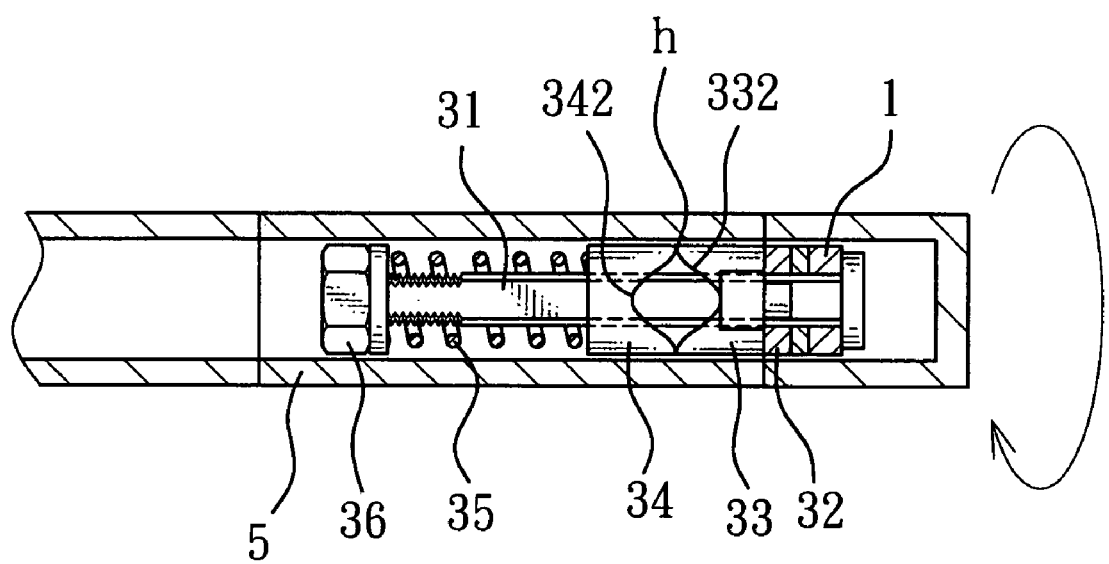
FIG. 11 is another sectional view of an embodiment of the invention.

By means of the construction set forth above the invention provides two types of use approaches to users. One is like the conventional notebook computer that is flappable at a maximum angle about 180 degrees (referring to FIGS. 6, 7 and 8). During flipping, first, unfold the first chassis 4; the fastening axle 22 of the resistant hinge 2 serves as the axis of the flipping for a first stage, namely the sleeve 21 is turnable while the fastening axle remains still so that the first chassis 4 can be freely swiveled between 0-180 degrees (preferably between 90-130 degrees). Thereby the key zone 51 on the second chassis 5 can be used like a conventional notebook computer, or the display screen 41 on the first chassis 4 can be looked at like the conventional one. Another use approach is to flip the first chassis 4 more than 270 degrees so that the first chassis 4 and the second chassis 5 are formed in a back-to-back manner (referring to FIGS. 9, 10 and 11). During flipping, first, swivel the first chassis 4, the fastening axle 22 of the resistant hinge 2 serves as an axis, and the first chassis 4 is swiveled over 180 degrees and can be continuously swiveled downwards. Meanwhile, the turning force is greater than the force of the spring 35 pushing the second element 34 so that the stem 31 becomes the swiveling center, and also becomes the axis of a second stage swiveling to drive the stem 31 and the second element 34 (referring to FIG. 11). The second cam action surface 342 slides on the first cam action surface 332 and moves to an apex h. Hence the first chassis 4 can continuously swivel about the cam hinge 3 approximately 180 degrees. As a result the total flipping angle can reach at least between 270 degrees and 360 degrees. Thus the first chassis 4 and the second chassis 5 are formed in the back-to-back manner to be used as a tablet computer. The first and second chassis 4 and 5 can be held by hands to do input operation.

As a conclusion, by means of the double-hinge structure of the invention, users can have two alternatives when in use. One is like the conventional notebook computer, and another one is to flip the screen more than 270 degrees to make the keyboard and the screen in a back-to-back manner. Hence user can spend less time of trials and errors in learning new operation interfaces. It can effectively overcome the shortcomings of the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A wide-angle double-hinge structure comprising:
    a) a coupling plate having a first retaining hole and a second retaining hole;
    b) a resistant hinge having a sleeve and a fastening axle, the sleeve is movable relative to the fastening axle, the fastening axle is connected to the first retaining hole of the coupling plate; and
    c) a cam hinge having a stem, an anchor plate, a first element, a second element, and a spring, the stem having a screw thread section and a polygonal section, the stem is inserted through the second retaining hole, the anchor plate, the first element, the second element, and the spring, a nut is connected to the screw thread section of the stem, the first element has a first cam action surface and a latch stub, the anchor plate has an anchor hole, the latch stub of the first element being inserted into the anchor hole of the anchor plate and fixing the first element relative to the anchor plate, the second element has a second cam action surface, the spring pressing the first cam action surface against the second cam action surface,
    wherein the coupling plate and the second element rotating concurrently with the polygonal section of the stem.

2. The wide-angle double-hinge structure of claim 1, wherein the sleeve and the anchor plate are respectively connected to a first chassis and a second chassis of an electronic device.

3. The wide-angle double-hinge structure of claim 2, wherein the first chassis has a display screen and the second chassis has at least one key zone.

4. The wide-angle double-hinge structure of claim 1, wherein the sleeve has at least one fastening hole at an end opposite the axle hole.

5. The wide-angle double-hinge structure of claim 1, wherein the anchor plate has a first bracing plate located perpendicular to a second bracing plate thereof.

6. The wide-angle double-hinge structure of claim 1, wherein the first retaining hole and the second retaining hole are non-circular through holes.

7. The wide-angle double-hinge structure of claim 1, wherein the sleeve has an axle hole, the fastening axle has a bolt inserted into the axle hole of the sleeve.

8. The wide-angle double-hinge structure of claim 1, wherein the sleeve and the anchor plate are independently rotatable relative to the coupling plate.

* * * * *